(12) United States Patent
Yoshinaka

(10) Patent No.: US 6,574,290 B1
(45) Date of Patent: Jun. 3, 2003

(54) DIGITAL INFORMATION REPRODUCING APPARATUS AND REPRODUCING METHOD

(75) Inventor: Tadaaki Yoshinaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/431,755

(22) Filed: Nov. 1, 1999

(30) Foreign Application Priority Data

Nov. 2, 1998 (JP) ............................................ 10-312055

(51) Int. Cl.$^7$ .............................. H03D 1/00; H04L 27/06
(52) U.S. Cl. ........................... 375/341; 375/262; 386/91
(58) Field of Search ..................... 360/32; 369/47–50, 369/54; 375/34, 240–262, 341; 386/109, 111–112, 95–126, 33, 91; 714/794

(56) References Cited

U.S. PATENT DOCUMENTS

| | | | | |
|---|---|---|---|---|
| 5,162,953 A | * | 11/1992 | Seki et al. ..................... 360/32 |
| 5,828,638 A | * | 10/1998 | Inagawa et al. ......... 369/53.31 |
| 5,966,415 A | * | 10/1999 | Bliss et al. .................. 375/341 |
| 6,188,735 B1 | * | 2/2001 | Soichi et al. ............... 375/262 |
| 6,370,324 B1 | * | 4/2002 | Kawahara et al. .......... 348/705 |
| 6,374,035 B1 | * | 4/2002 | Yamashita .................... 360/48 |

* cited by examiner

*Primary Examiner*—Stephen Chin
*Assistant Examiner*—Lawrence Williams
(74) *Attorney, Agent, or Firm*—Frommer Lawrence & Haug LLP; William S. Frommer; Glenn F. Savit

(57) ABSTRACT

A digital information reproducing apparatus and method in which a digital reproduction signal is equalized by predetermined equalizing characteristics, and a first clock signal is formed on the basis of the equalized signal. The digital reproduction signal is A/D converted using the first clock signal. A predetermined time base decompression is performed on the A/D converted signal every signal portion by the first clock signal and a second, lower frequency clock signal which is supplied separately from the first clock signal. Decoding data is output by performing a maximum likelihood decoding process to the signal after time base decompression. A predetermined time base compression is performed to the decoding data output by the maximum likelihood decoding process.

19 Claims, 11 Drawing Sheets

Fig. 10
| JUST PREVIOUS INPUT a(k−1) | STATUS b(k−1) | INPUT a(k) | OUTPUT c(k) | NEXT STATUS b(k) |
|---|---|---|---|---|
| 0 | S0 | 0 | 0 | S0 |
| 0 | S0 | 1 | 1 | S1 |
| 1 | S1 | 0 | 1 | S0 |
| 1 | S1 | 1 | 2 | S1 |
Fig. 11
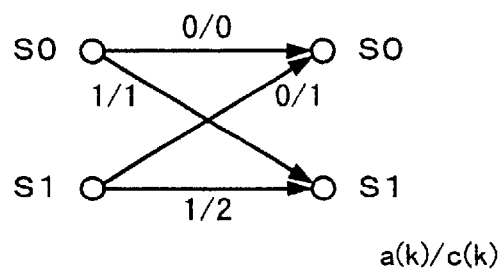
a(k)/c(k)
Fig. 12
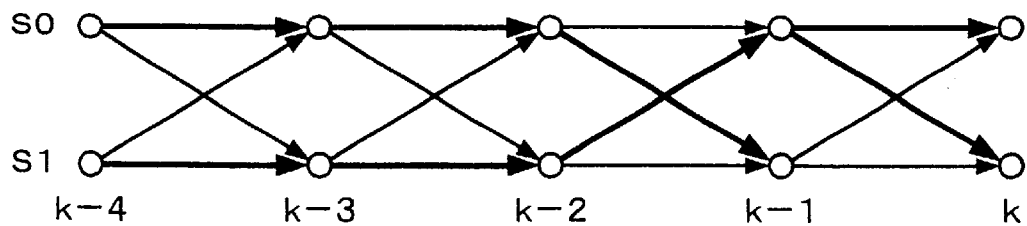

DIGITAL INFORMATION REPRODUCING APPARATUS AND REPRODUCING METHOD

BACKGROUND OF THE INVENTION

1. Field of the Invention

The invention relates to a digital information reproducing apparatus such as a magnetic disk apparatus or the like and relates to a reproducing method.

2. Description of the Related Art

In recent years, a maximum likelihood decoding system has frequently been used as a signal processing system which enables a high density recording. According to the maximum likelihood decoding system, maximum likelihood data is decoded at each time point while an amplitude level of a reproduction signal at a previous time point is referred to. If it has been known that the reproduction signal changes under some restriction, by knowing information regarding the reproduction signal at the previous time point, the decoding of higher precision than that in case of decoding by a bit-by-bit system can be performed.

In a PRML (Partial Response Maximum Likelihood) system which is a typical maximum likelihood decoding system and is constructed by a combination of a Viterbi decoding method and Partial Response, problems in the maximum likelihood decoding system will now be described hereinbelow with respect to PR1ML using, particularly, Partial Response Class 1 (hereinbelow, referred to as PR1) as an example.

An equalization signal which is obtained by PR1 equalization is also called PR(1,1). When "1" is inputted, an intercode interference of "1" occurs in the next bit. Therefore, two statuses (S0, S1) are determined in dependence on whether the just previous input value is equal to "0" or "1". An output value is, further, decided by the next input value in each of those statuses and the status is shifted to the next status. FIG. 10 shows an example of a rule of such a status transition. FIG. 11 is a trellis diagram showing a state of a status transition which can occur for one time point.

As a specific process to decide the status transition on the basis of the reproduction signal, the square of a difference between a reproduction signal level and a reference amplitude level (expected value) is calculated as follows at each time k. Calculation values which are obtained by such a method are referred to as branch metrics.

$$BM10 = (Z(k)-1)^2 \quad (1)$$

$$BM11 = (Z(k)-2)^2 \quad (2)$$

$$BM00 = (Z(k)-0)^2 \quad (3)$$

$$BM01 = (Z(k)-1)^2 \quad (4)$$

The equation (1) denotes a probability with respect to an assumption that the status S1 is shifted to the status S0. The equation (2) denotes a probability with respect to an assumption that the status S1 is shifted to the status S1. The equation (3) denotes a probability with respect to an assumption that the status S0 is shifted to the status S0. The equation (4) denotes a probability with respect to an assumption that the status S0 is shifted to the status S1.

As mentioned above, according to the maximum likelihood decoding system, maximum likelihood data is decoded at each time point while the amplitude level of the reproduction signal at the previous time point is referred to. For this purpose, the sum of the branch metrics until the status reaches the status S0 or S1 at each time point is stored. The sum of the branch metrics is called a path metric. In the actual decoding process, the value of the path metric is updated at each time k in accordance with the following calculations.

$$MT0_k = \min(MT0_{k-1}+BM00, MT1_{k-1}+BM10) \quad (5)$$

$$MT1_k = \min(MT0_{k-1}+BM01, MT1_{k-1}+BM11) \quad (6)$$

where, $MT0_k$ denotes a path metric of the status S0 at time k and $MT0_{k-1}$ denotes a path metric of the status S0 at time k−1. Similarly, $MT1_k$ denotes a path metric of the status S1 at time k and $MT1_{k-1}$ denotes a path metric of the status S1 at time k−1.

An arithmetic operating process according to the equation (5) is an operation for calculating probabilities of the path reaching S0 from S0 and the path reaching S0 from S1 for an interval from time k−1 to time k and leaving the more probable path. An arithmetic operating process according to the equation (6) is an operation for calculating probabilities of the path reaching S1 from S0 and the path reaching S1 from S1 for an interval from time k−1 to time k and leaving the more probable path.

At time k, when the path reaching S0 from S0 is selected by the arithmetic operating process according to the equation (5) and the path reaching S1 from S0 is selected by the arithmetic operating process according to the equation (6), it is determined that the status at time k−1 is S0 and the statuses (paths) at all times before time k−1 are determined. An example of the paths which are determined in this manner is shown by bold lines in FIG. 12. FIG. 12 shows an example of trellis diagrams among a plurality of time points.

A decoding apparatus for performing a maximum likelihood decoding has a construction to realize the foregoing processes. That is, the decoding apparatus has: a branch metric calculating circuit for calculating values of branch metrics in accordance with the equations (1) to (4); an ACS (Add Compare select) circuit for calculating the sum of a branch metric which is newly calculated at time k and the path metrics calculated until time k−1 in accordance with the equations (5) and (6) and selecting the more probable path on the basis of a calculation value; and a path memory circuit for storing a value of the path metric at time point k−1 which is used in the arithmetic operating process by the ACS at each time point k.

The ACS circuit will now be described in more detail hereinbelow in order to explain the problems in the maximum likelihood decoding. FIG. 13 shows an example of the ACS circuit. Two ACS circuits 100 and 200 perform the arithmetic operating processes according to the equations (5) and (6), respectively. In the arithmetic operating processes, an adding process, a comparing process, and a selecting process have to be performed as a series of processes for a period of time of one clock. In the ACS circuits 100 and 200, therefore, pipeline processes cannot be performed, it is also extremely difficult to perform parallel processes, and this results in a large obstacle in realization of a high processing speed of the Viterbi decoder.

As a recording modulating system, a (1,7) RLL (Run Length Limited) code in which: the number of "0" between "1" and "1" is limited to 1 or more and 7 or less, a (2, 7) RLL code in which the number of "0" between "1" and "1" is limited to 2 or more and 7 or less, or the like is known. According to those codes, since a shortest inverting interval $T_{min}$ is large, they are suitable for short wavelength recording. However, a clock rate rises (1.5 times, 2 times, respectively). Therefore, the combination of those recording modulating systems and the maximum likelihood decoding are improper to perform the recording and/or reproduction at a high speed.

OBJECTS AND SUMMARY OF THE INVENTION

It is an object of the invention to provide a digital information reproducing apparatus and a reproducing method which can solve the problems in the conventional techniques and perform the maximum likelihood decoding at a high speed.

According to one aspect of the invention, there is provided a digital information reproducing apparatus in which a digital reproduction signal that is reproduced from a recording media, and that is constructed by collecting Partial Response encoded signal portions each having a predetermined data amount is decoded by maximum likelihood decoding, comprising:

equalizing means for equalizing the digital reproduction signal by predetermined equalizing characteristics;

clock forming means for forming a first clock signal on the basis of an output of the equalizing means;

A/D converting means for A/D (analog/digital) converting the digital reproduction signal by the first clock signal;

time base decompressing means for performing a predetermined time base decompression to an output of the A/D converting means every signal portion by the first clock signal and a second clock signal which is supplied separately from the first clock signal and has a lower frequency than that of the first clock signal; and maximum likelihood decoding means for outputting decoding data by performing a maximum likelihood decoding process to an output of the time base decompressing means, wherein the digital reproduction signal is time base decompressed prior to maximum likelihood decoding the digital reproduction signal.

Further, in the digital information reproducing apparatus of the invention, the time base decompressing means is constructed by a plurality of time base decompressors, the maximum likelihood decoding means is also constructed by a plurality of maximum likelihood decoders connected to the time base decompressors, respectively, each of the time base decompressors sequentially time base decompresses one of division data of signal portions of the digital reproduction signals which is different from the other division data, and the maximum likelihood decoders perform the maximum likelihood decoding to an output of each of the time base decompressors connected to them.

According to another aspect of the invention, there is provided a digital information reproducing method in which a digital reproduction signal that is reproduced from a recording media, and that is constructed by collecting Partial Response encoded signal portions each having a predetermined data amount is decoded by maximum likelihood decoding, comprising:

an equalizing step of equalizing the digital reproduction signal by predetermined equalizing characteristics;

a clock forming step of forming a first clock signal on the basis of the equalized signal;

an A/D converting step of A/D (analog/digital) converting the digital reproduction signal by the first clock signal;

a time base decompressing step of performing a predetermined time base decompression to an output in the A/D converting step every signal portion by the first clock signal and a second clock signal which is supplied separately from the first clock signal and has a lower frequency than that of the first clock signal; and a maximum likelihood decoding step of outputting decoding data by performing a maximum likelihood decoding process to an output in the time base decompressing step, wherein the digital reproduction signal is time base decompressed prior to maximum likelihood decoding the digital reproduction signal.

According to the present invention, a data that is to be decoded is provided to the maximum likelihood decoding circuit after time base decompression is done. Therefore, operation rate of a decoding circuit is not to affect the operation rate of the whole circuits that performs decoding process.

The above and other objects and features of the present invention will become apparent from the following detailed description and the appended claims with reference to the accompanying drawings.

BRIEF DESCRIPTION OF THE DRAWINGS

FIG. 10 is a schematic diagram for explaining inputs/outputs in the maximum likelihood decoding and a status transition;

FIG. 11 is a schematic diagram showing an example of a trellis diagram for one clock in the maximum likelihood decoding;

FIG. 12 is a schematic diagram showing an example of a trellis diagram among a plurality of clocks in the maximum likelihood decoding.

DETAILED DESCRIPTION OF THE PREFERRED EMBODIMENTS

Figure 1:
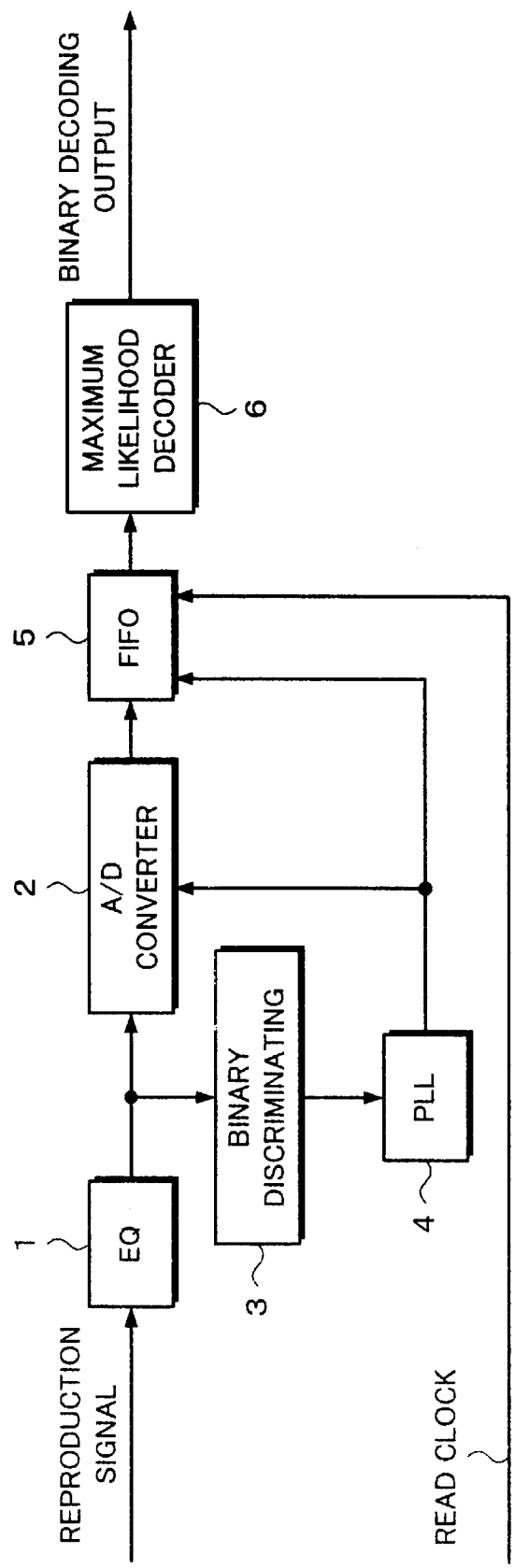
FIG. 1 is a block diagram for explaining a construction of an embodiment of the invention.

An embodiment of the invention will now be described hereinbelow with reference to the drawings. First, the embodiment of the invention will be explained with reference to FIG. 1. For example, a reproduction signal which is reproduced from a recording medium such as a magnetooptic disk is supplied to an equalizer 1. The equalizer 1 equalizes the supplied reproduction signal to a signal of equalizing characteristics suitable for processes at the post stage. An output of the equalizer 1 is supplied to an A/D converter 2 and a binary discriminating circuit 3. The binary discriminating circuit 3 performs a binary discriminating process to the output of the equalizer 1 and sends the binary discrimination processed signal to a PLL 4. The PLL 4 generates a clock on the basis of the supplied signal. The clock is supplied to the A/D converter 2 and an FIFO (First-In First-Out) 5 as a buffer circuit.

The A/D converter 2 A/D converts the output of the equalizer 1 at the timing according to the clock supplied from the PLL 4 and sends a converted output to the FIFO 5. The FIFO 5 fetches the output of the A/D converter 2 at the timing according to the clock generated from the PLL 4. Further, a read clock to instruct a reading timing is supplied to the FIFO 5. By setting a frequency of the read clock to be lower than a frequency of the clock supplied from the PLL 4, a signal in which the output of the A/D converter 2 has been time base decompressed can be obtained as an output of the FIFO 5. With a construction such that this signal is supplied to a maximum likelihood decoder 6, the maximum likelihood decoder 6 can perform a process to form a binary decoding output at a desired speed. The read clock is generated by, for example, a quartz oscillator or the like.

Figure 2:
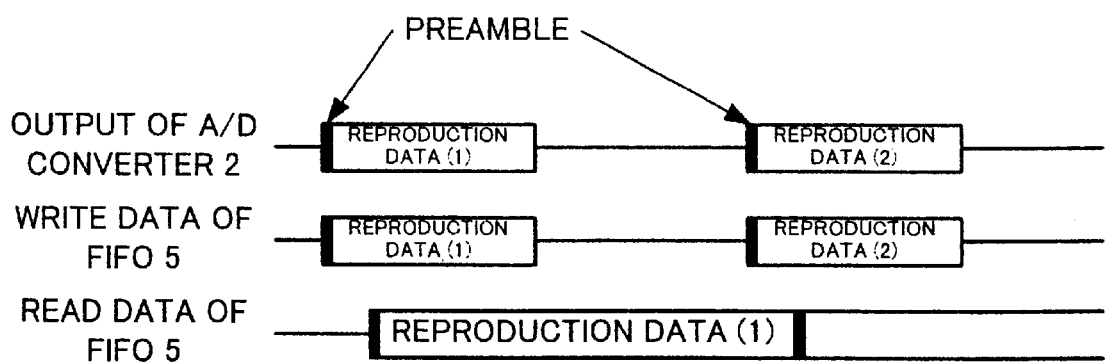
FIG. 2 is a schematic diagram for explaining timings for processes in the construction of the embodiment of the invention.

FIG. 2 shows an example of writing and reading timings for the FIFO 5. For example, reproduction data (1), reproduction data (2), . . . of every data unit that is constructed by adding a preamble of a few head samples such as track, sector, or the like are outputted from the A/D converter 2 at predetermined time intervals and written into the FIFO 5. The reproduction data (1), reproduction data (2), . . . which were time base decompressed as mentioned above are read from the FIFO 5. As will be explained hereinlater, since the preamble has been added, it is guaranteed to perform the maximum likelihood decoding to all of the valid data in the reproduction data (1), reproduction data (2), . . .

It is also possible to provide a buffer circuit including an FIFO or the like at the post stage of the maximum likelihood decoder 6 and supply clocks of proper frequencies as a write clock and a read clock for the buffer circuit, thereby changing the time base of binary decoding data and obtaining a desired decoding rate.

In the above embodiment of the invention, an amount of data which can be continuously written into the FIFO 5 is limited by a memory capacity of the FIFO 5 and set to, for example, an amount of one track or one sector. Therefore, in case of decoding data of a certain amount or more, a binary decoding output by the maximum likelihood decoder 6 is intermittent. On the other hand, another embodiment of the invention in which the limitation of the amount of data which can be continuously written into the buffer circuit is actually eliminated and even if an amount of data to be reproduced is large, the binary decoding output can be always continuously performed will now be described hereinbelow with reference to FIG. 3. The equalizer 1, A/D converter 2, binary discriminating circuit 3, and PLL 4 are similar to those in the embodiment of the invention described above with reference to FIG. 1. In another embodiment of the invention, two processes systems each including an FIFO and a maximum likelihood decoder are provided at the post stage of the A/D converter 2.

That is, a processing system including an FIFO 51, a maximum likelihood decoder 61, and an FIFO 71 and a processing system including an FIFO 52, a maximum likelihood decoder 62, and an FIFO 72 are provided at the post stages of the A/D converter 2. The output of the A/D converter 2 is supplied and written into the FIFOs 51 and 52. Data which is read out from the FIFOs 51 and 52 is sent to the maximum likelihood decoders 61 and 62. The maximum likelihood decoders 61 and 62 perform the maximum likelihood decoding process on the basis of the supplied data, form binary decoding data, and send the formed binary decoding data to the FIFOs 71 and 72, respectively.

The clock which is generated by the PLL 4 is supplied to the FIFOs 51 and 52 and the data is alternately and repetitively written on a unit basis of a predetermined amount of data such as one track, one sector, or the like at the timing according to the supplied clock. The read clock is further supplied to the FIFOs 51 and 52 and the data is read out from the FIFOs 51 and 52 at the timing according to the read clock. The read clock is formed by a frequency divider 9 for frequency dividing a reference clock that is formed by, for example, a quartz oscillator or the like and converting it into a frequency of ½. It is assumed that the reference clock has a frequency that is extremely close to that of the clock which is generated from the PLL 4. The data of the frequency that is equal to almost ½ of that upon writing as mentioned above can be supplied to the maximum likelihood decoders 61 and 62.

The maximum likelihood decoders 61 and 62 perform the maximum likelihood decoding process to the supplied data, form the binary decoding data, and supply the formed binary decoding data to the FIFOs 71 and 72, respectively. The clock which is formed by the frequency divider 9 and has the frequency of ½ of that of the reference clock is supplied to maximum likelihood decoders 61 and 62. Therefore, the decoding processing operation and the output of the binary decoding data are performed at the frequency that is almost equal to ½ of that upon writing.

On the other hand, the clock of the frequency of ½ of that of the reference clock which is formed by the frequency converting circuit 9 and the reference clock are supplied to the FIFOs 71 and 72. The binary decoding data which is outputted from the maximum likelihood decoders 61 and 62 at the frequency of ½ of that of the reference clock is written into the FIFOs 71 and 72. The data written is read out at the timing according to the reference clock. The time base of the binary decoding data is compressed by the operations of the FIFOs 71 and 72 and is set to be almost identical to that upon writing. Outputs of the FIFOs 71 and 72 are supplied to a switch 8.

An FIFO read data switching signal is further supplied to the switch 8. The switch 8 outputs one of the outputs of the FIFOs 71 and 72 to the post stage in response to the FIFO read data switching signal. As will be explained hereinlater, the binary decoding data is mutually complimentarily included in the outputs of the FIFOs 71 and 72. Therefore, by properly selecting one of the outputs of the FIFOs 71 and 72 by the operation of the switch 8, the continuous binary decoding output can be performed.

In case of performing the maximum likelihood decoding, generally, a reproduction signal of continuous several bits that is preceding to the signal portion to be decoded is needed. In another embodiment of the invention, as mentioned above, the data is set to targets of the decoding processes by the maximum likelihood decoders 61 and 62 every recording unit of a predetermined amount specified in the recording format such as track, sector, or the like. In those recording units, a point that a preamble signal or the like including continuous several bits is added to the position that is precedent to the valid data has been specified as a recording format, so that all valid data in each recording unit can be maximum likelihood decoded. Such a situation is also similarly applied to the embodiment of the invention mentioned above.

As mentioned above, the reference clock is set to a frequency which is extremely close to that of the clock generated from the PLL 4. When a deviation occurs between the clocks, the deviation of the timings is absorbed in the signal portions such as preamble signal, post amble signal, or the like other than the valid data.

Figure 4:
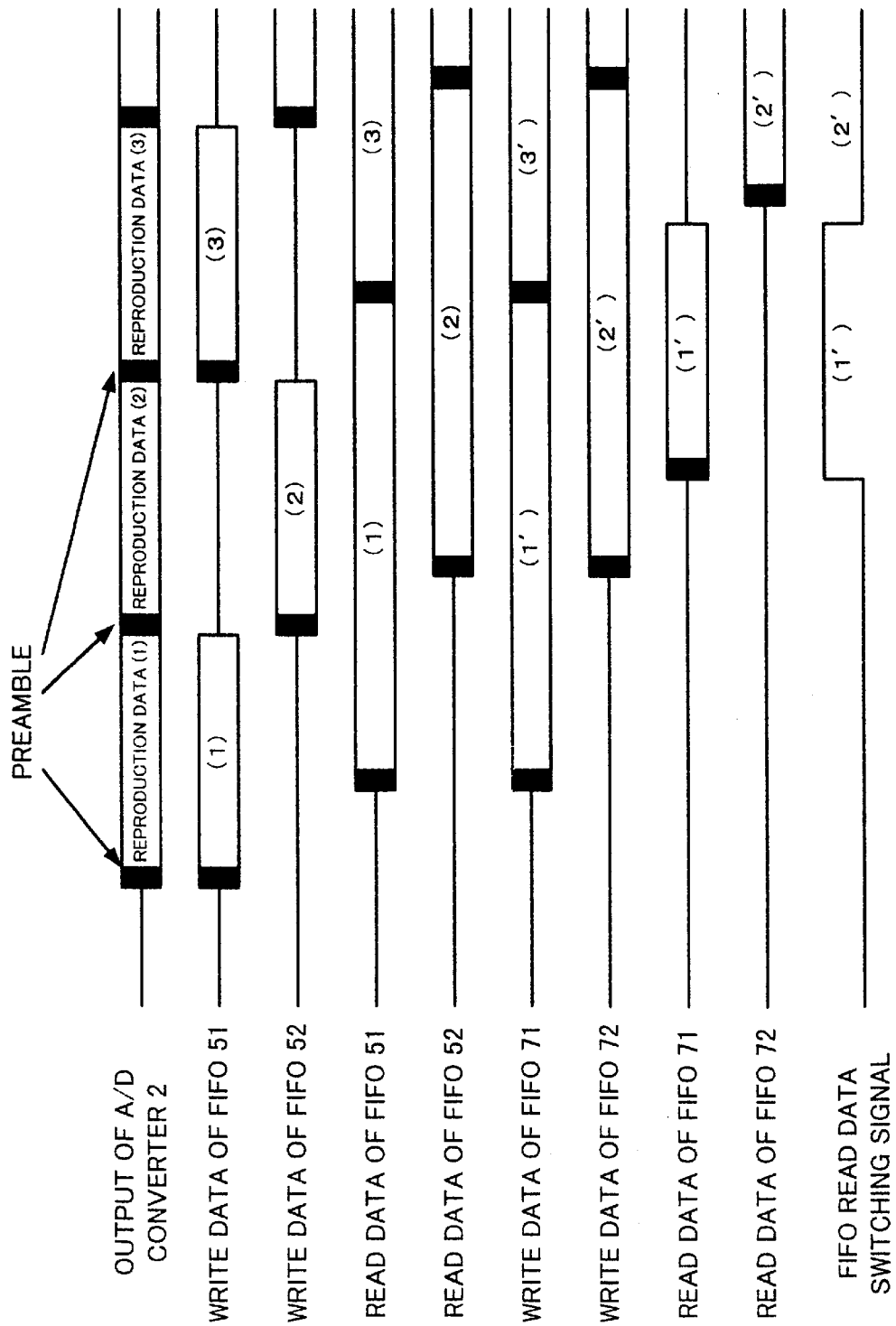
FIG. 4 is a schematic diagram for explaining timings for processes in the construction of another embodiment of the invention.

FIG. 4 shows an example of writing and reading timings for the FIFOs 51 and 52 and FIFOs 71 and 72. For example, the reproduction data (1), (2), . . . of every data unit to which a preamble of head several samples such as track, sector, or the like has been added is continuously outputted from the A/D converter 2. For example, the reproduction data (1), (3), . . . are written into the FIFO 51. For example, the reproduction data (2), (4), . . . are written into the FIFO 52. The reproduction data (1), (3), . . . which have been time base decompressed as mentioned above are read out from the FIFO 51 and the reproduction data (2), (4), . . . which have been time base decompressed are read out from the FIFO 52.

For example, binary decoding data (1)', (3)', . . . are written into the FIFO 71 and binary decoding data (2)', (4)', . . . are written into the FIFO 72. The binary decoding data (1)', (3)', . . . which were time base compressed as mentioned above are read out from the FIFO 71 and the binary decoding data (2)', (4)', . . . which were time base compressed are read out from the FIFO 72.

Further, the FIFO read data switching signal is set to "high" when the switch 8 is controlled so as to transfer the output of the FIFO 71 to the post stage and is set to "low" when the switch 8 is controlled so as to transfer the output of the FIFO 72 to the post stage. By such a control to the switch 8, the continuous binary decoding output can be performed.

Figure 3:
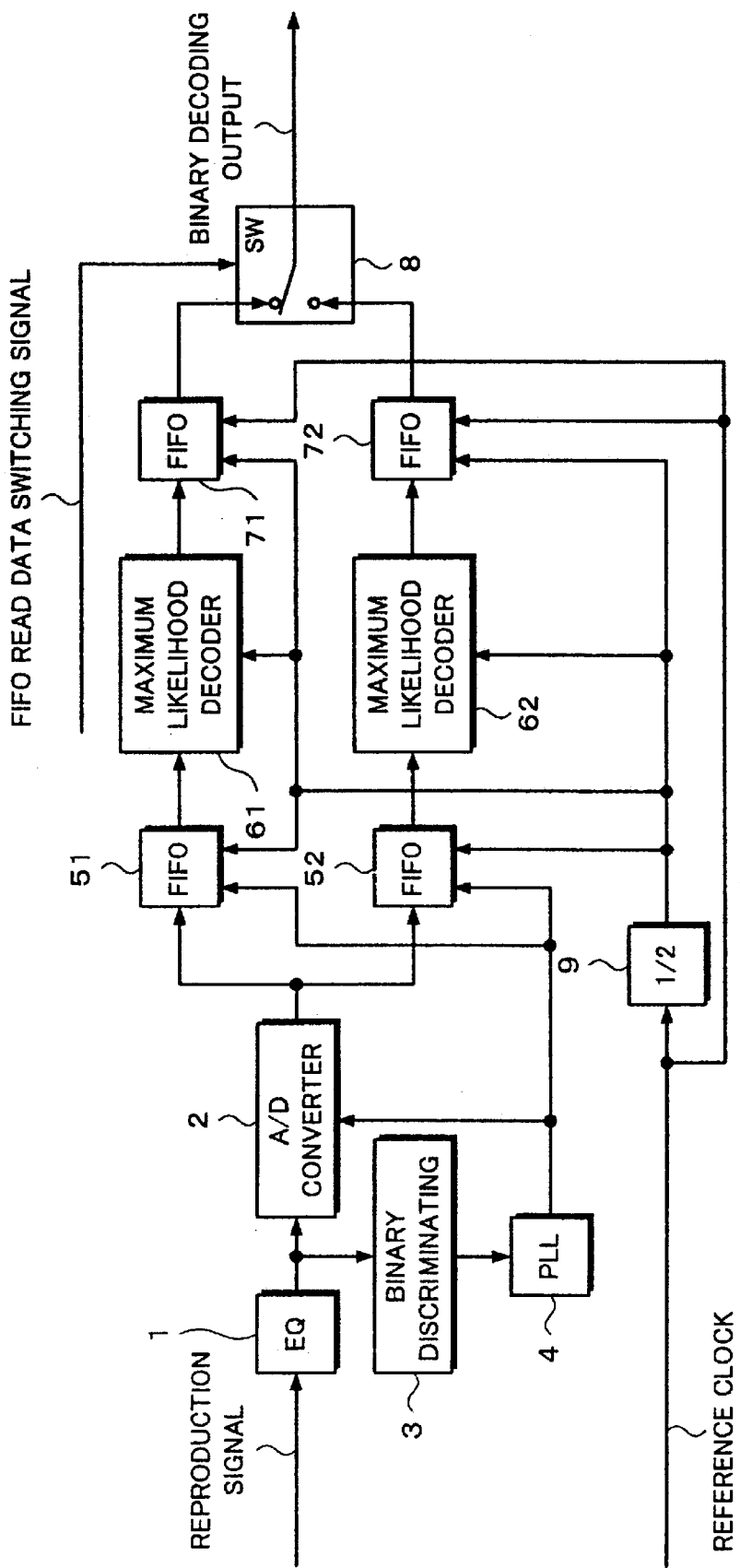
FIG. 3 is a block diagram for explaining a construction of another embodiment of the invention.
Figure 5:
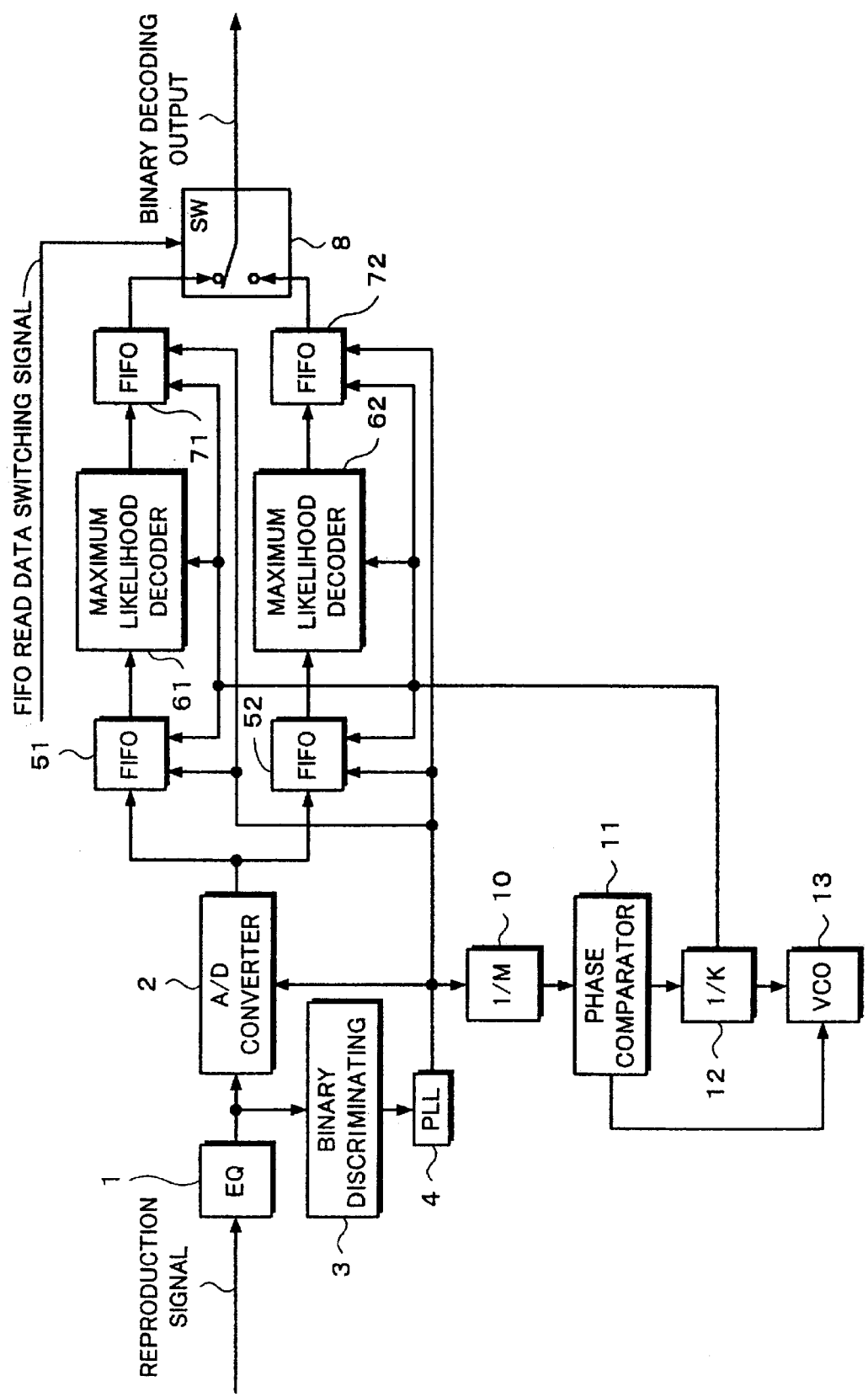
FIG. 5 is a block diagram for explaining a construction of still another embodiment of the invention.

A further embodiment of the invention in which a capacity of the memory in the buffer circuit can be reduced will now be described with reference to FIG. 5. In FIG. 5, component elements similar to those in FIG. 3 are designated by the same reference numerals. The output of the A/D converter 2 is supplied to the FIFOs 51 and 52 and written therein, respectively. In this instance, the data which is written into the FIFOs 51 and 52 has an overlapped portion "$O_V$" such as 16 samples or the like (refer to FIG. 6). The data read out from the FIFOs 51 and 52 is supplied to the maximum likelihood decoders 61 and 62. The maximum likelihood decoders 61 and 62 perform the maximum likelihood decoding process on the basis of the supplied data, form binary decoding data, and supply the formed binary decoding data to the FIFOs 71 and 72, respectively.

The clock formed by the PLL 4 is supplied to the FIFOs 51 and 52 and the data is alternately repetitively written on a unit basis of a predetermined amount of data at the timing according to the supplied clock. As will be explained hereinlater, the predetermined amount in this instance can be set to be smaller than that of the track, sector, or the like.

The read clock is further supplied to the FIFOs 51 and 52 and the data written in the FIFOs 51 and 52 is read out at the timing according to the read clock. The read clock is formed by multiplying the frequency of the reference clock similar to that in the foregoing other embodiment of the invention by K/M (K and M are integers as will be explained hereinlater). In this manner, the data of the frequency that is almost K/M times as high as the frequency upon writing can be supplied to the maximum likelihood decoders 61 and 62. To obtain the read clock by increasing the frequency of the reference clock KIM times, a PLL unit including a frequency divider 10, a phase comparator 11, a frequency divider 12, and a VCO (Voltage Controlled Oscillator) 13 is provided.

The maximum likelihood decoders 61 and 62 perform the decoding process to the supplied data, form the binary decoding data, and supply the formed binary decoding data to the FIFOs 71 and 72, respectively. The clock of the frequency which is K/M times as high as the frequency of the reference clock formed by the PLL unit mentioned above is supplied to the maximum likelihood decoders 61 and 62. Therefore, the decoding processing operation and the output of the binary decoding data are performed at the frequency that is almost K/M times as high as the frequency upon writing.

The clock of the frequency that is K/M times as high as the frequency of the reference clock and the reference clock are supplied to the FIFOs 71 and 72. The binary decoding data which is outputted from the maximum likelihood decoders 61 and 62 is written into the FIFOs 71 and 72 at the frequency that is K/M times as high as the frequency of the reference clock. The data is read out from the FIFOs 71 and 72 at the frequency of the reference clock. The time base of the binary decoding data is compressed by such an operation of the FIFOs 71 and 72 and is set to be almost identical to the time base upon writing into the FIFOs 51 and 52. The outputs of the FIFOs 71 and 72 are supplied to the switch 8.

The FIFO read data switching signal is further inputted to the switch 8. The switch 8 selectively transmits one of the outputs of the FIFOs 71 and 72 in response to the FIFO read data switching signal. The binary decoding data is mutually complimentarily included in the outputs of the FIFOs 71 and 72 as will be explained hereinlater. Therefore, since one of the outputs of the FIFOs 71 and 72 is properly selected by the operation of the switch 8, the binary decoding data can be continuously outputted.

As described above, the reproduction signal of continuous several bits which is precedent to the signal portion to be decoded is needed to perform the maximum likelihood decoding. Therefore, in the cases other than the case where the data is supplied to the maximum likelihood decoders every recording unit in which the preamble is added to the head of the valid data and which has been specified in the recording format like an embodiment of the invention mentioned above or like another embodiment of the invention, there is a possibility that the valid data is not decoded with respect to a few bits from the head of the supplied data.

In still another embodiment of the invention, the data which is used as a target of the decoding process by the maximum likelihood decoders 61 and 62 as mentioned above has an overlapped portion. Therefore, by properly setting the data amount of the overlapped portion, even if the data as a target of the decoding is supplied on a unit basis of a data amount smaller than the recording unit specified in the recording format to the maximum likelihood decoders 61 and 62, it is possible to prevent that a gap is caused between the binary decoding data which is formed by the maximum likelihood decoders 61 and 62.

Therefore, all valid data is decoded in the whole binary decoding data (namely, in the output of the switch 8) which is formed by the maximum likelihood decoders 61 and 62. If an overlap occurs between the binary decoding data which is formed by the maximum likelihood decoders 61 and 62, it is necessary to make the switch 8 operative so as to delete such an overlap and output the data.

According to still another embodiment of the invention as mentioned above, it is sufficient that the FIFOs 51 and 52 and FIFOs 71 and 72 have enough memory capacity to perform the processes by using the data amount smaller than the recording unit such as track, sector, or the like specified in the recording format as a unit. Thus, the total memory capacity in the decoding processing system can be reduced.

Figure 6:
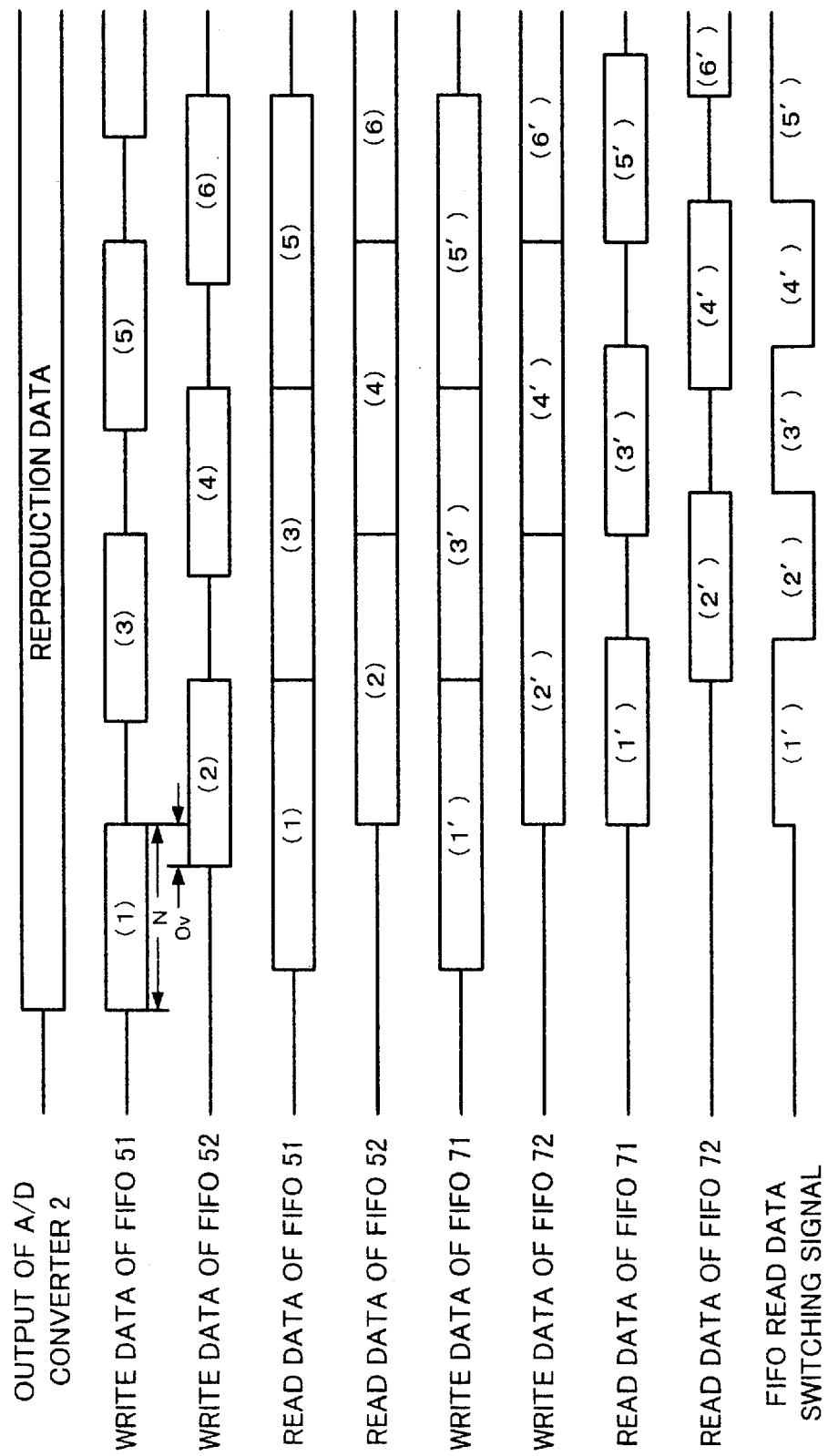
FIG. 6 is a schematic diagram for explaining timings for processes in the construction of still another embodiment of the invention.

FIG. 6 shows an example of writing and reading timings for the FIFOs 51 and 52 and FIFOs 71 and 72 in still another embodiment of the invention. Since there is no need to consider the recording unit such as track, sector, or the like specified in the recording format as a problem here, the reproduction data is continuously outputted from the A/D converter 2. The data unit comprising a predetermined data amount (N samples) in the reproduction data is alternately written into the FIFOs 51 and 52. For example, the data units (1), (3), . . . . are written into the FIFO 51 and the data units (2), (4), . . . are written into the FIFO 52. As the number of each data unit is larger, this data portion corresponds to the data portion that is later with respect to time in the reproduction data.

As mentioned above, the process is performed so as to cause an overlapped portion between the adjacent data units. For example, an overlapped portion $O_V$ is provided between the data units (1) and (2). The data units (1), (3), . . . which were time base decompressed as mentioned above are read out from the FIFO 51 and the data units (2), (4), . . . which were time base decompressed are read out from the FIFO 52.

For example, the binary decoding data units (1)', (3)', . . . are written into the FIFO 71 and the binary decoding data units (2)', (4)', . . . are written into the FIFO 72. The binary decoding data units (1)', (3)', . . . which were time base compressed as mentioned above are read out from the FIFO 71 and the binary decoding data units (2)', (4)', . . . which were time base compressed are read out from the FIFO 72.

Further, the FIFO read data switching signal is set to "high", for example, in case of controlling the switch 8 so as to transmit the output of the FIFO 71 to the post stage and is set to "low" in case of controlling the switch 8 so as to transmit the output of the FIFO 72 to the post stage. By such a control to the switch 8, with respect to the overlapped portion between the adjacent binary decoding data units, only the portion in one of the binary decoding data is outputted and the portion in the other binary decoding data is deleted. FIG. 6 shows a state where the overlapped portion in the binary decoding data unit that is always precedingly located with regard to time is outputted.

For example, as for the overlapped portion between the binary decoding data (1)' and (2)', only the portion in the binary decoding data (1)' is outputted and the portion in the binary decoding data (2)' is deleted. As for the overlapped portion between the binary decoding data (2)' and (3)', only the portion in the binary decoding data (2)' is outputted and the portion in the binary decoding data (3)' is deleted. In this manner, the continuous binary decoding output without an overlapped portion can be generated. It is also possible to control the switch 8 by a method different from that shown in FIG. 6, for instance, by a method whereby the overlapped portion in the binary decoding data unit which is always located later with regard to time is outputted or the like.

While the FIFOs 51 and 52 buffer the output of the A/D converter 2 generally having 5 to 6 bits per sample, the FIFOs 71 and 72 buffer the binary decoding data of one bit. Therefore, the memory capacity of each of the FIFOs 71 and 72 can be set to be smaller than that of the FIFOs 51 and 52. Thus, the total memory capacity in the processing system can be largely reduced by setting the unit of the data which is continuously supplied to the maximum likelihood decoders 61 and 62 as small as possible. The unit of the data which is continuously supplied to the maximum likelihood decoders 61 and 62 needs to be set to a value within a range where there is no obstacle in the maximum likelihood decoding in consideration of constructing conditions such as a path memory length and the like in the maximum likelihood decoders 61 and 62 and various conditions such as setting of the overlap data amount and the like.

The following values are considered as more specific numerical value examples.

Writing frequency $F_W$: 100 MHz

Overlap data amount $O_V$: 16 samples

Reading frequency $F_r$: 60 MHz

Memory capacity of the FIFO: 128 samples

In the above set values, a sequence (the number of write samples: N) which can continuously decode is obtained by the following equation (3).

$$N/F_r = (N-16) \times 2/F_W \quad (3)$$

N=96 samples is obtained by substituting $F_W$=100 MHz and $F_r$=60 MHz into the equation (3). Therefore, it is sufficient to set the memory capacities of the FIFOs 51 and 52 to, for example, a value corresponding to 128 samples. In the construction of FIG. 5, by setting: M=5 and K=3, the reading clock ($F_r$=60 MHz) is formed by the PLL unit including the frequency divider 10, phase comparator 11, frequency divider 12, and VCO .13. If the reading frequency $F_r$ can be set to a fraction of an integer of the writing frequency $F_W$, the reading clock can be formed by merely frequency dividing the writing clock.

Figure 7:
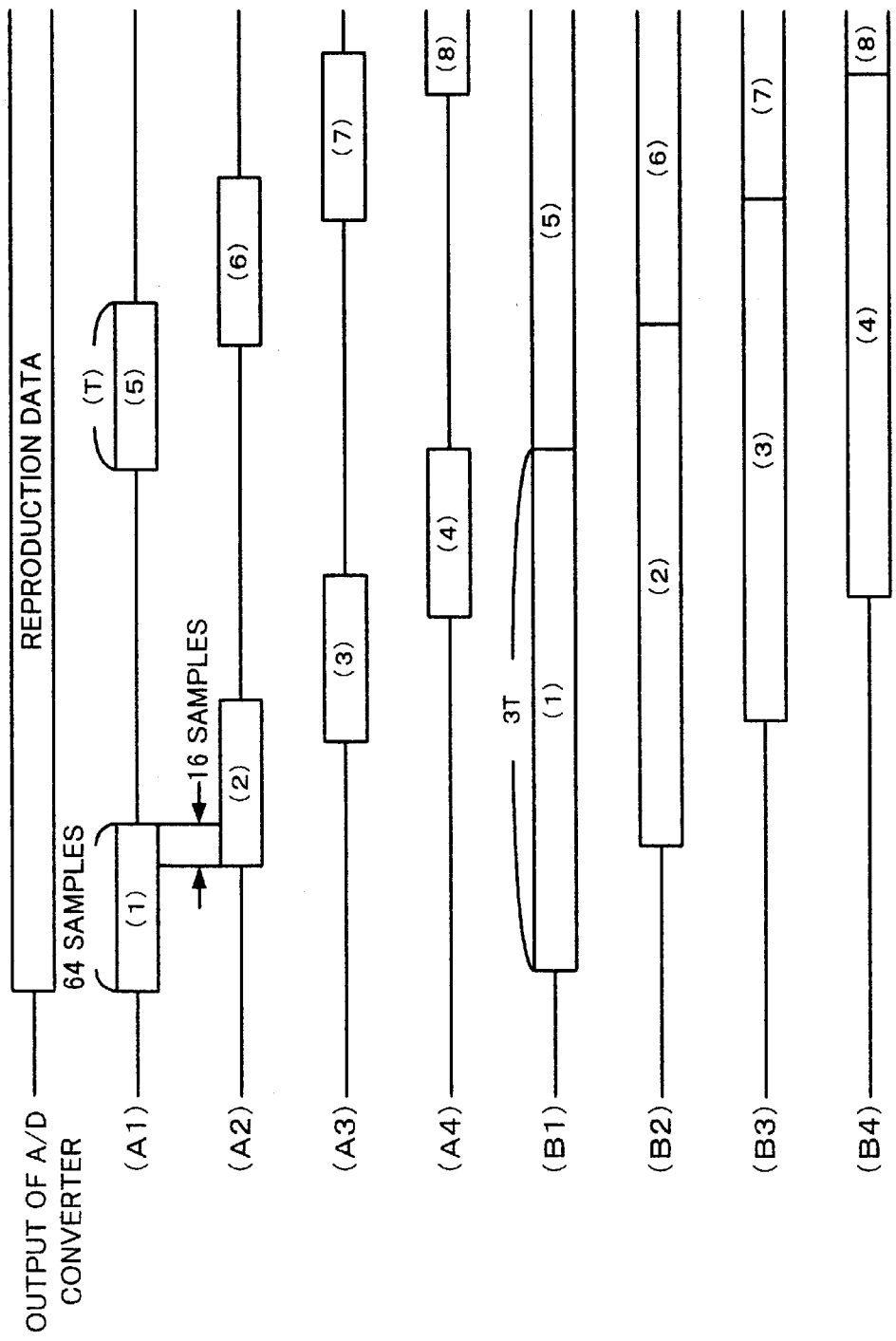
FIG. 7 is a schematic diagram for explaining a specific example of timings for processes in the construction of still another embodiment of the invention.

Although the foregoing still another embodiment of the invention has two processing systems each comprising the FIFOs and the maximum likelihood decoders, a further large number of processing systems each comprising the FIFOs and the maximum likelihood decoders can be constructed. FIG. 7 shows an example of a timing chart showing a processing sequence with respect to the case where four processing systems each comprising the FIFOs and the maximum likelihood decoders are used and a decoding speed is set to ⅓ of the writing frequency $F_W$. Data which is written into four FIFOs provided in parallel at the front stage of the maximum likelihood decoders are labelled as $A_1, A_2, A_3$, and $A_4$ and data which is read out from the four FIFOs is set to $B_1, B_2, B_3$, and $B_4$, respectively. In this case, by setting the overlap data amount $O_V$ to 16 samples, the sequence (the number N of writing samples) which can continuously decode is obtained by the following equation (4).

$$N/F_r = (N-16) \times 4/F_W \quad (4)$$

Since the decoding speed is set to ⅓ of the writing frequency $F_W$, $F_W/F_r$=3, so that N=64 samples is obtained from the equation (4).

The data of every 64 samples in the reproduction data from the A/D converter 2 is written as $A_1, A_2, A_3$, and $A_4$ into the four FIFOs. That is, for example, the data units (1), (5), . . . are written into the first FIFO ($A_1$). For example, the data units (2), (6), . . . are written into the second FIFO ($A_2$). For example, the data units (3), (7), . . . are written into the third FIFO ($A_3$). For example, the data units (4), (8), . . . are written into the fourth FIFO ($A_4$). As the number of data unit is larger, the data corresponds to the data portion that is located later with respect to time in the reproduction data. A time base corresponding to each data unit is expressed by T.

As mentioned above, 16 samples are overlapped between the adjacent data units. The data units (1), (5), ... in which the time base is decompressed to three times and becomes 3T are read out from the first FIFO ($B_1$). The data units (2), (6), ... which were time base decompressed are read out from the second FIFO ($B_2$). The data units (3), (7), ... which were time base decompressed are read out from the third FIFO ($B_3$). The data units (4), (8), ... which were time base decompressed are read out from the fourth FIFO ($B_4$).

In this manner, the data units in which the time base was decompressed to three times can be supplied to the maximum likelihood decoders. Therefore, by intermittently writing every 64 samples into the four FIFOs in each processing system, the continuous decoding process can be performed through the whole four processing systems. By increasing the number of processing systems each comprising the FIFOs and maximum likelihood decoders, the memory capacity of the FIFO in each processing system can be further reduced.

By providing the construction as mentioned above (four FIFOs are necessary) at the post stage of each maximum likelihood decoder with reference to FIG. 5 or the like and performing the processes as mentioned above with reference to FIG. 6 or the like, the time base compression, synthesis, and the like for the outputs of the maximum likelihood decoders can be performed.

According to all of the embodiments of the invention or the like mentioned above, the buffer circuit to perform the function to reduce the frequency at the time of supplying the data to be decoded to the maximum likelihood decoders is constructed by using the FIFO. On the other hand, further another embodiment of the invention in which the buffer circuit is constructed by using a shift register which can be more easily formed as an IC in place of the FIFO is also possible.

Figure 8:
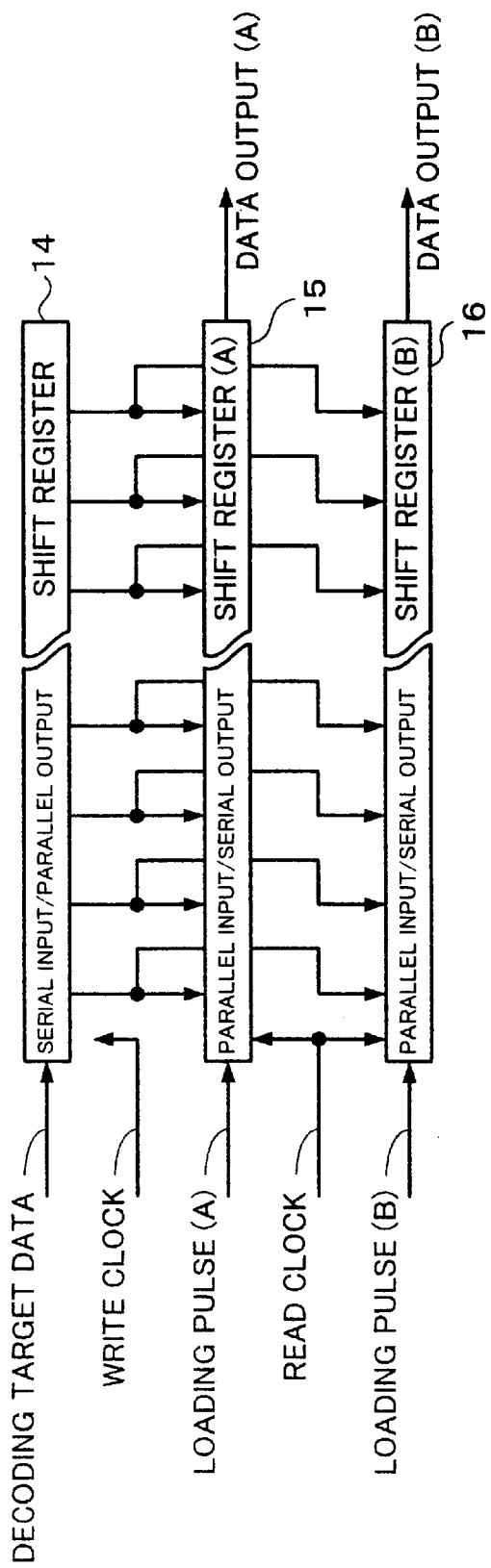
FIG. 8 is a block diagram for explaining a construction of further another embodiment of the invention.

A construction of further another embodiment of the invention will be described with reference to FIG. 8. Decoding target data such as an output of the A/D converter or the like is supplied to a shift register 14 of a serial input/parallel outputs (hereinafter, referred to as a shift register 14). The write clock is further supplied to the shift register 14. The decoding target data is written into the shift register 14 every N samples at the timing according to the write clock.

After that, each data is written into shift registers 15 and 16 of parallel inputs/serial output (hereinafter, referred to as a shift register 15 and a shift register 16, respectively) while setting N samples into a unit. The writing start time point in this instance is instructed by loading pulses A and B which are supplied to the shift registers 15 and 16, respectively. The read clock of the frequency of, for example, ½ of that of the write clock is further supplied to the shift registers 15 and 16. The data of every N samples is read out from the shift registers 15 and 16 and supplied to the maximum likelihood decoders at the timing according to the read clock. By setting the frequency of the read clock to be lower than that of the write clock, the time base of the data which is supplied to each maximum likelihood decoder is decompressed.

Figure 9:
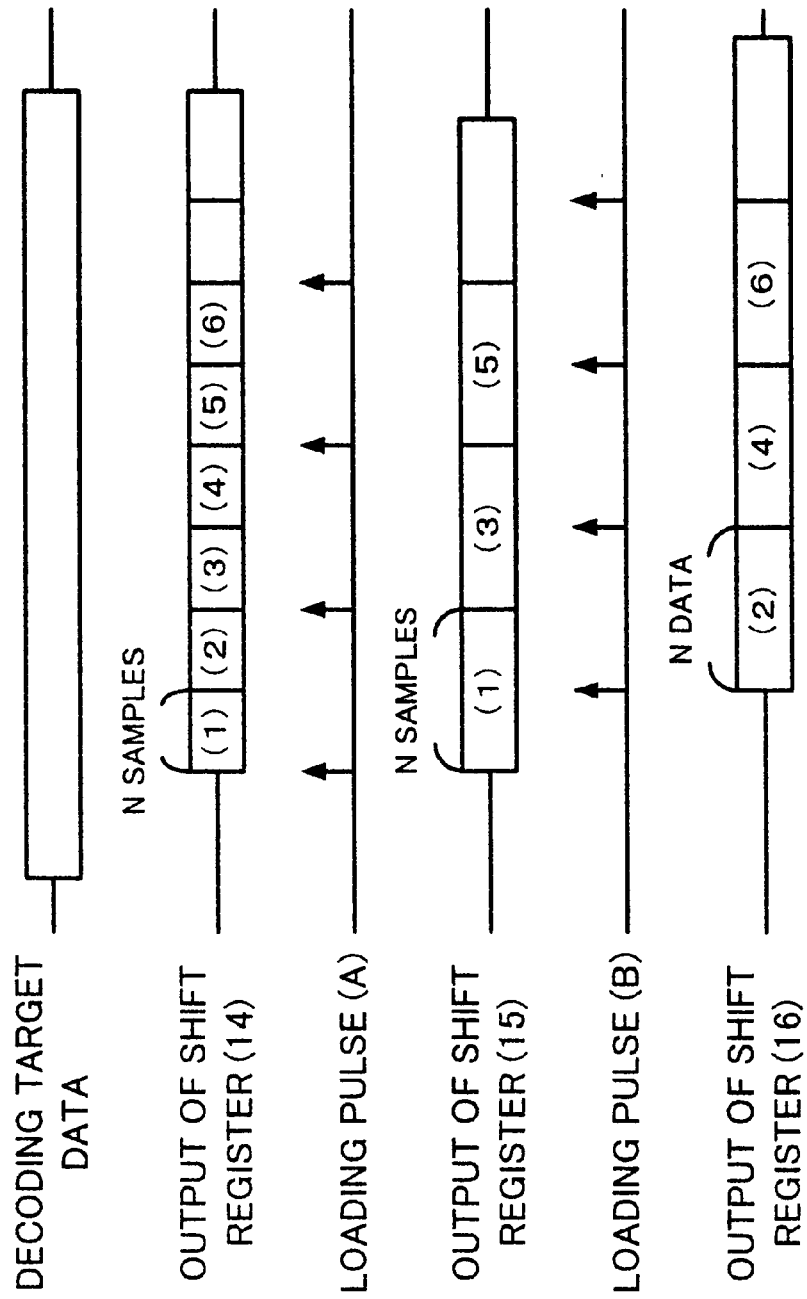
FIG. 9 is a schematic diagram for explaining timings for processes in the construction of further another embodiment of the invention.
Figure 13:
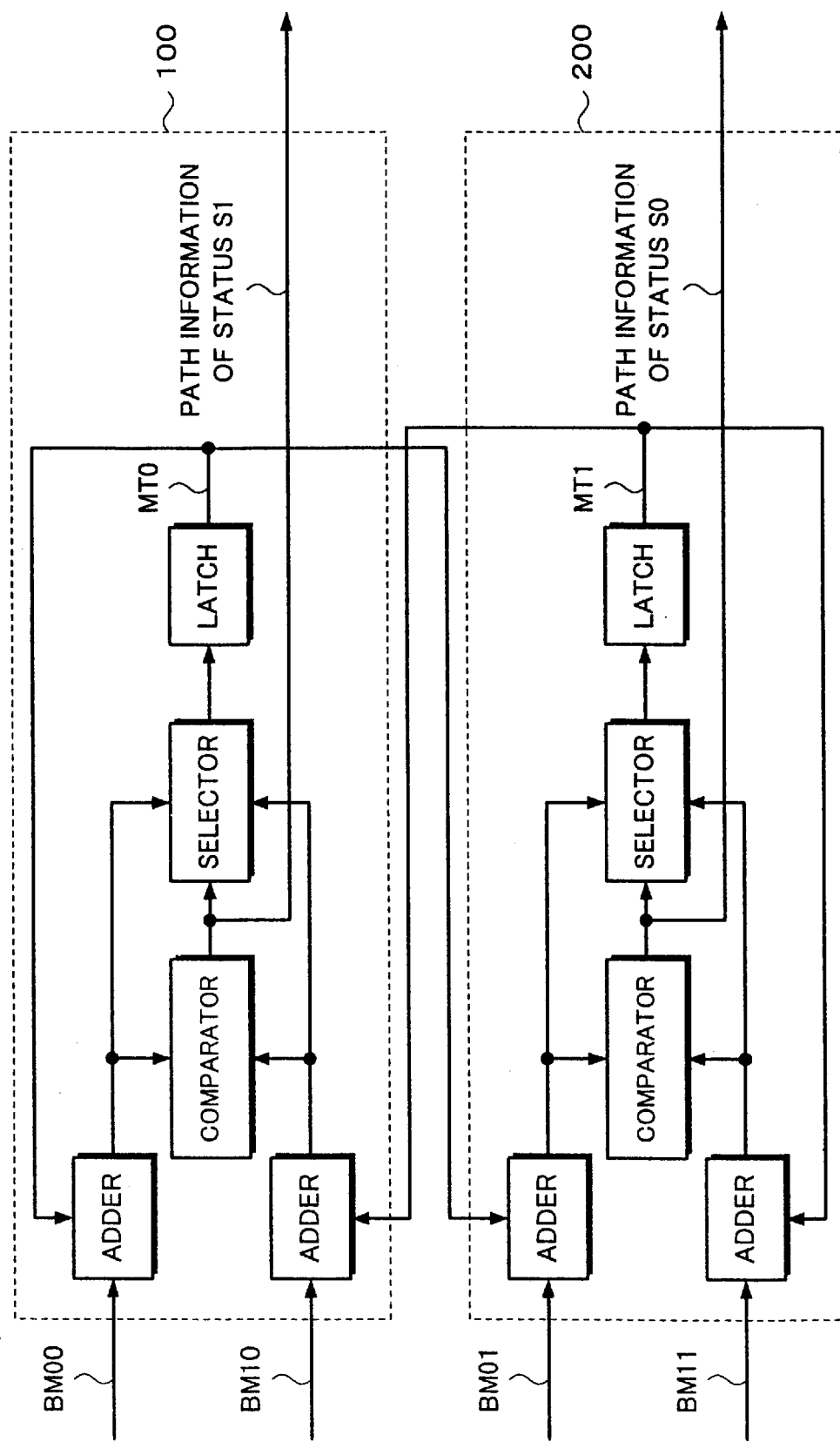
FIG. 13 is a block diagram for explaining a construction of a Viterbi decoder to perform the maximum likelihood decoding.

FIG. 9 shows an example of a timing chart showing a state of data processes in an example of further another embodiment of the invention. The decoding target data which is continuously supplied is sequentially written into the shift register 14 at the timing according to the write clock and, after that, outputted as data units (1), (2), ... each having a predetermined data amount (N samples). As the number of each data unit is larger, this data unit corresponds to the data portion which is later with respect to time in the reproduction data. The data is written into the shift registers 14 and 15 at the time point of generation of the loading pulses A and B. Therefore, in case of generating the loading pulses A and B at timings as shown in FIG. 9 in the relationship with the outputs of the data units (1), (2), ..., the data units (1), (3), ... are written into the shift register 14, and for example, the data units (2), (4), ... are written into the shift register 15.

Since each of the written data units is immediately read out in response to the read clock, the data units (1), (3), ... which were time base decompressed are read out from the shift register 15 and the data units (2), (4), ... which were time base decompressed are read out from the shift register 16 as shown in FIG. 9.

The time base compression, synthesis, and the like for the outputs of the maximum likelihood decoders can be performed by providing a construction including a shift register of serial input/parallel outputs, a shift register of parallel inputs/serial output, and the like at the post stage of the maximum likelihood decoders and performing processes corresponding to the processes as mentioned above with reference to FIG. 6 and the like.

The above description relates to the construction which has two decoding processing systems each having the buffer circuit that is formed by using the shift register and in which the time base of the data that is supplied to the maximum likelihood decoders in each processing system is decompressed to, for example, two times (namely, the data rate is reduced into ½). On the other hand, it is also possible to use a construction having three or more decoding processing systems each having a buffer circuit formed by using a shift register. In this case, there is an advantage that the number of stages of the shift registers can be reduced or the like.

The invention is not limited to the foregoing embodiment, another embodiment, still another embodiment, and further another embodiment of the invention mentioned above but many variations and modifications are considered without departing from the spirit of the invention.

What is claimed is:

1. A digital information reproducing apparatus in which a digital reproduction signal that is reproduced from a recording media, and that is constructed by Partial Response encoded signal portions each having a predetermined data amount is decoded by maximum likelihood decoding, comprising:

equalizing means for equalizing said digital reproduction signal by predetermined equalizing characteristics;

clock forming means for forming a first clock signal on the basis of an output of said equalizing means;

A/D converting means for A/D (analog/digital) converting said digital reproduction signal by said first clock signal;

time base decompressing means for performing a predetermined time base decompression to an output of said A/D converting means every said signal portion by said first clock signal and a second clock signal which is supplied separately from said first clock signal and has a lower frequency than that of said first clock signal;

maximum likelihood decoding means for outputting decoding data by performing a maximum likelihood decoding process to an output of said time base decompressing means; and time base compressing means for performing a predetermined time base compression to the decoding data of an output of said maximum likelihood decoding means.

2. A digital information reproducing apparatus in which a digital reproduction signal that is reproduced from a recording media, and that is constructed by Partial Response encoded signal portions each having a predetermined data amount is decoded by maximum likelihood decoding, comprising:

equalizing means for equalizing said digital reproduction signal by predetermined equalizing characteristics;

clock forming means for forming a first clock signal on the basis of an output of said equalizing means;

A/D converting means for A/D (analog/digital) converting said digital reproduction signal by said first clock signal;

time base decompressing means for performing a predetermined time base decompression to an output of said A/D converting means every said signal portion by said first clock signal and a second clock signal which is supplied separately from said first clock signal and has a lower frequency than that of said first clock signal; and maximum likelihood decoding means for outputting decoding data by performing a maximum likelihood decoding process to an output of said time base decompressing means;

wherein, said signal portion has a predetermined recording unit in which preamble data has been added before valid data of a predetermined amount and a non-signal period of a predetermined length at every predetermined period of said recording unit, and said time base decompressing means decompresses said recording unit to a time length that is equal to the sum of at least a time length corresponding to said recording unit and said non-signal period.

3. An apparatus according to claim 2, wherein said recording unit is a track in a recording format of said recording medium.

4. An apparatus according to claim 2, wherein said recording unit is a sector in a recording format of said recording medium.

5. An apparatus according to claim 1, wherein said time base decompressing means comprises an FIFO element in which said first clock signal is used as a write clock and said second clock signal is used as a read clock.

6. A digital information reproducing apparatus in which a digital reproduction signal that is reproduced from a recording media, and that is constructed by Partial Response encoded signal portions each having a predetermined data amount is decoded by maximum likelihood decoding, comprising:

equalizing means for equalizing said digital reproduction signal by predetermined equalizing characteristics;

clock forming means for forming a first clock signal on the basis of an output of said equalizing means;

A/D converting means for A/D (analog/digital) converting said digital reproduction signal by said first clock signal;

time base decompressing means for performing a predetermined time base decompression to an output of said A/D converting means every said signal portion by said first clock signal and a second clock signal which is supplied separately from said first clock signal and has a lower frequency than that of said first clock signal; and maximum likelihood decoding means for outputting decoding data by performing a maximum likelihood decoding process to an output of said time base decompressing means;

wherein said time base decompressing means comprises:

a shift register of a serial/parallel conversion for serial/parallel converting the output of said A/D converting means on the basis of said first clock signal; and a shift register of a parallel/serial conversion for converting outputs of said serial/parallel conversion shift register into a serial output on the basis of said second clock signal.

7. An apparatus according to claim 1, wherein said time base compressing means comprises an FIFO element to which a clock signal whose frequency has been set so as to set an output of said maximum likelihood decoding means to a desired rate is supplied.

8. An apparatus according to claim 1, wherein said time base compressing means comprises:

a serial/parallel conversion shift register to which a clock signal whose frequency has been set so as to set the decoding data of an output of said maximum likelihood decoding means to a desired rate is supplied and which serial/parallel converts an output of said maximum likelihood decoding means; and a parallel/serial conversion shift register for converting outputs of said serial/parallel conversion shift register into a serial output.

9. A digital information reproducing apparatus in which a digital reproduction signal that is reproduced from a recording media, and that is constructed by Partial Response encoded signal portions each having a predetermined data amount is decoded by maximum likelihood decoding, comprising:

equalizing means for equalizing said digital reproduction signal by predetermined equalizing characteristics;

clock forming means for forming a first clock signal on the basis of an output of said equalizing means;

A/D converting means for A/D (analog/digital) converting said digital reproduction signal by said first clock signal;

time base decompressing means for performing a predetermined time base decompression to an output of said A/D converting means every said signal portion by said first clock signal and a second clock signal which is supplied separately from said first clock signal and has a lower frequency than that of said first clock signal; and maximum likelihood decoding means for outputting decoding data by performing a maximum likelihood decoding process to an output of said time base decompressing means;

wherein, said time base decompressing means comprises a plurality of time base decompressors, each of said time base decompressors sequentially performs a predetermined time base decompression to one different division data among a predetermined number of division data obtained by dividing said signal portion in connection with said first clock signal and a second clock signal which is supplied separately from said first clock signal and which has a frequency lower than that of said first clock signal, and said maximum likelihood decoding means comprises a plurality of maximum likelihood decoders which are respectively connected to said plurality of time base decompressors, each of said plurality of maximum likelihood decoders performs a maximum likelihood decoding process to an output of said connected time base decompressor on the basis of said second clock signal and outputs decoding data, and said digital information reproducing apparatus further including decoding data synthesizing means to which the decoding data of outputs of said plurality of maximum likelihood decoders is supplied and which synthesizes said decoding data to a decoding output of one system.

10. An apparatus according to claim 9, wherein said decoding data synthesizing means comprising a plurality of time base compressors connected to said plurality of maximum likelihood decoders, and each of said time base compressors comprises:

time base compressing means for performing a predetermined time base decompression to the decoding data of the output of said connected maximum likelihood decoder on the basis of said second clock signal and a third clock signal whose frequency is higher than that of said second clock signal; and switching means for selecting any of outputs of said plurality of time base compressors in accordance with a control signal and outputting said selected output as decoding data of one system.

11. An apparatus according to claim 9, wherein said division data is constructed by a predetermined recording unit in which preamble data is added before a predetermined amount of valid data, and each of said time base decompressors decompresses said division data to data of a length that is at least twice as long as a time length corresponding to said division data.

12. An apparatus according to claim 11, wherein said recording unit is a track in a recording format of said recording medium.

13. An apparatus according to claim 11, wherein said recording unit is a sector in a recording format of said recording medium.

14. An apparatus according to claim 9, wherein said plurality of time base decompressors comprise FIFO elements in which said first clock signal is used as a write clock and said second clock signal is used as a read clock.

15. An apparatus according to claim 9, wherein said plurality of time base decompressors comprise:

shift registers of a serial/parallel conversion for serial/parallel converting the output of said A/D converting means on the basis of said first clock signal; and shift registers of a parallel/serial conversion for converting outputs of said serial/parallel conversion shift registers into a serial output on the basis of said second clock signal.

16. An apparatus according to claim 10, wherein said plurality of time base compressors comprise FIFO elements to which a clock signal whose frequency has been set so as to set outputs of said plurality of maximum likelihood decoders to a desired rate is supplied.

17. An apparatus according to claim 10, wherein said plurality of time base compressors comprise:

serial/parallel conversion shift registers to which a clock signal whose frequency has been set so as to set the decoding data of an output of said maximum likelihood decoding means to a desired rate is supplied and which serial/parallel converts an output of said maximum likelihood decoding means; and parallel/serial conversion shift registers for converting outputs of said serial/parallel conversion shift registers into a serial output.

18. An apparatus according to claim 9, wherein said division data comprises a recording unit having a predetermined number of overlap data between the adjacent division data and a predetermined amount of valid data, and each of said time base decompressors time base decompresses the division data having said predetermined number of overlap data to data of a time length corresponding to at least one period of said division data.

19. A digital information reproducing method in which a digital reproduction signal that is reproduced from a recording media, and that is constructed by Partial Response encoded signal portions each having a predetermined data amount is decoded by maximum likelihood decoding, comprising the steps of:

equalizing said digital reproduction signal by predetermined equalizing characteristics;

forming a first clock signal on the basis of said equalized signal;

A/D (analog/digital) converting said digital reproduction signal by said first clock signal;

performing a predetermined time base decompression to an output in said A/D converting step every said signal portion by said first clock signal and a second clock signal which is supplied separately from said first clock signal and has a lower frequency than that of said first clock signal;

outputting decoding data by performing a maximum likelihood decoding process to an output in said time base decompressing step; and performing a predetermined time base compression to the decoding data of an output in said maximum likelihood decoding process.

* * * * *